United States Patent
Yi et al.

(10) Patent No.: US 12,180,636 B2
(45) Date of Patent: Dec. 31, 2024

(54) LEFTOVER LOAD DETECTION METHOD USING IMAGE RECOGNITION IN A LAUNDRY APPLIANCE

(71) Applicant: Haier US Appliance Solutions, Inc., Wilmington, DE (US)

(72) Inventors: Kyoung-june Yi, Yongin-si (KR); Je Kwon Yoon, Seongnam Gyeonggi (KR); Seung-Yeong Park, Seongnam (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 768 days.

(21) Appl. No.: 17/220,180

(22) Filed: Apr. 1, 2021

(65) Prior Publication Data

US 2022/0316124 A1    Oct. 6, 2022

(51) Int. Cl.
| | |
|---|---|
| *D06F 34/14* | (2020.01) |
| *D06F 103/04* | (2020.01) |
| *D06F 103/40* | (2020.01) |
| *D06F 105/58* | (2020.01) |
| *G06T 7/11* | (2017.01) |

(52) U.S. Cl.
CPC ............... *D06F 34/14* (2020.02); *G06T 7/11* (2017.01); *D06F 2103/04* (2020.02); *D06F 2103/40* (2020.02); *D06F 2105/58* (2020.02); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 7,516,629 B2 | 4/2009 | Behrens | |
| 9,534,337 B2 | 1/2017 | Balinski | |
| 2018/0080165 A1 | 3/2018 | Zatorski | |
| 2019/0382941 A1 | 12/2019 | Hwang | |
| 2020/0024792 A1 | 1/2020 | Lee | |
| 2022/0316124 A1 | 10/2022 | Yi et al. | |

FOREIGN PATENT DOCUMENTS

| | | |
|---|---|---|
| CN | 103266444 A | 8/2013 |
| CN | 105696254 B | 12/2017 |
| CN | 107904856 A | 4/2018 |
| CN | 111118811 A | 5/2020 |
| CN | 112411116 A | 2/2021 |
| CN | 116254674 A | 6/2023 |
| JP | 2003225491 A | 8/2003 |
| JP | 2020156527 A | 10/2020 |
| KR | 100873907 B1 | 12/2008 |

*Primary Examiner* — Rita P Adhlakha
(74) *Attorney, Agent, or Firm* — Dority & Manning, P.A.

(57) ABSTRACT

A laundry appliance includes a basket rotatably mounted within a cabinet and defining a chamber configured for receiving a load of clothes and a camera assembly mounted within the cabinet in view of the chamber. A controller is configured to implement a leftover load detection method including determining that an operating cycle of the laundry appliance has been completed and that a user has removed the load of clothes. A camera then obtains one or more images of the chamber and the images are analyzed to determine whether any articles of clothing remain in the chamber. If the image analysis identifies a leftover article remaining in the chamber, the method includes implementing a responsive action, such as providing a user notification.

15 Claims, 6 Drawing Sheets

LEFTOVER LOAD DETECTION METHOD USING IMAGE RECOGNITION IN A LAUNDRY APPLIANCE

FIELD OF THE INVENTION

The present subject matter relates generally to camera assemblies for use in laundry appliances, or more specifically, to the use of a camera assembly to identify laundry articles in laundry appliances.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle of a washing machine appliance, a drain pump assembly may operate to discharge water from within sump.

After an operating cycle is completed, a user typically removes the load of clothes from the basket and transfers the load to a dryer appliance for drying. However, users frequently fail to remove all articles from a load of clothes when emptying the basket. For example, clothes may remain plastered on the sides of the basket and/or may be inadvertently overlooked by the user. Similarly, smaller items such as socks are frequently overlooked. Notably, failing to remove these items commonly results in the items being rewashed with the next wash cycle or they may produce mold, mildew, or foul smells. A similar problem may occur in a dryer appliance after a dryer appliance is performed. For example, a user may leave one or more articles behind, resulting in repeated drying cycles for a particular article, and thus unavailability of an article when it is desired and potential damage to the article.

Accordingly, a laundry appliance including features and operating methods for ensuring all articles of clothing are removed after an operating cycle would be desirable. More specifically, a method for identifying articles of clothing and notifying a user would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a laundry appliance is provided including a cabinet, a basket rotatably mounted within the cabinet and defining a chamber configured for receiving a load of clothes, a door rotatably mounted to the cabinet for providing selective access to the chamber, and a camera assembly mounted within the cabinet and in view of the chamber. A controller is operably coupled to the camera assembly and is configured to determine that an operating cycle of the laundry appliance has been completed, determine that a user has removed the load of clothes, obtain one or more images of the chamber using the camera assembly, identify a leftover article remaining in the chamber by analyzing the one or more images of the chamber, and implement a responsive action in response to identifying the leftover article remaining in the chamber.

In another exemplary embodiment, a method of operating a laundry appliance is provided. The laundry appliance includes a basket rotatably mounted within a cabinet and defining a chamber configured for receiving a load of clothes, a door rotatably mounted to the cabinet for providing selective access to the chamber, and a camera assembly mounted within the cabinet in view of the chamber. The method includes determining that an operating cycle of the laundry appliance has been completed, determining that a user has removed the load of clothes, obtaining one or more images of the chamber using the camera assembly, identifying a leftover article remaining in the chamber by analyzing the one or more images of the chamber, and implementing a responsive action in response to identifying the leftover article remaining in the chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
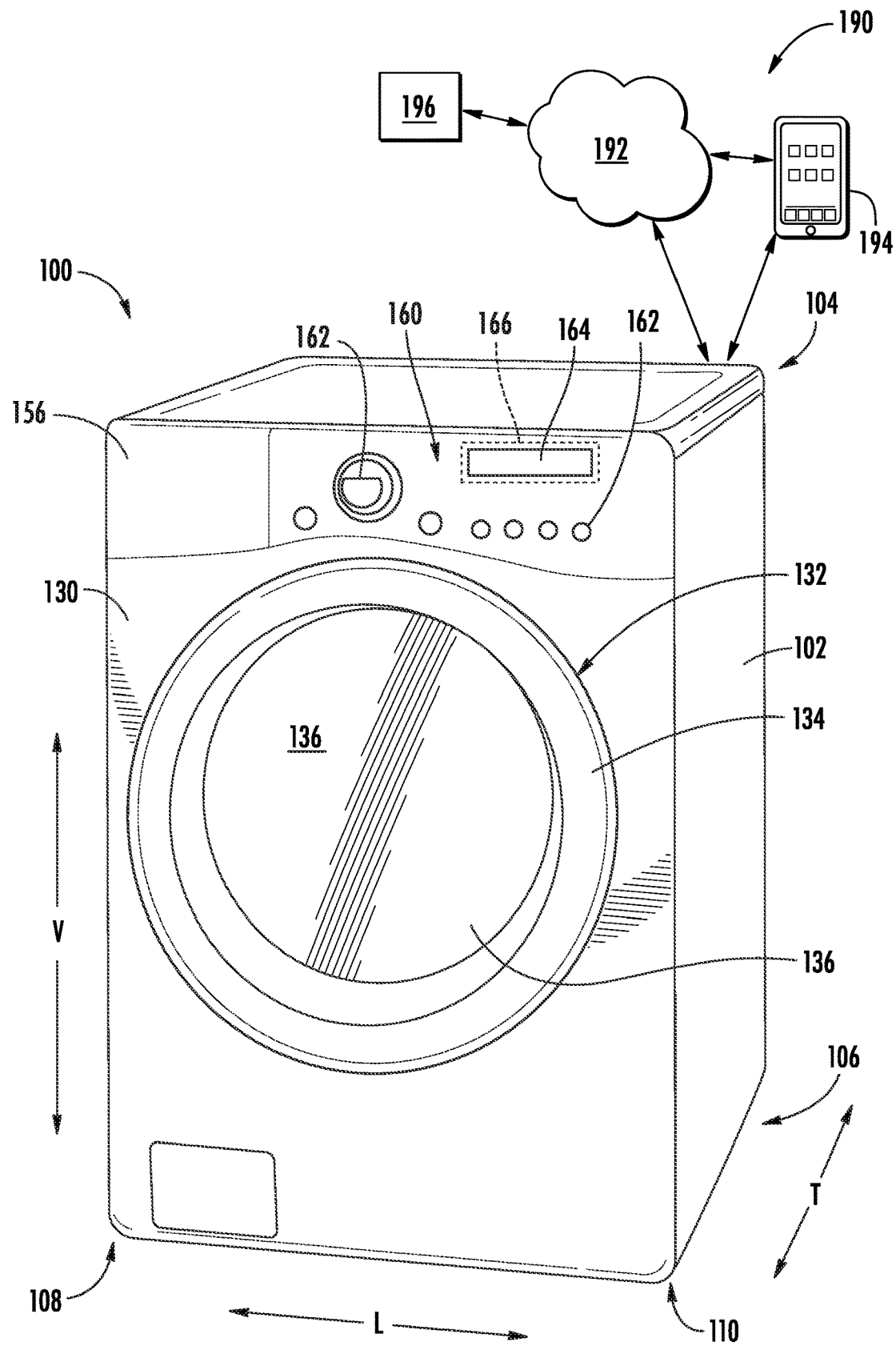
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
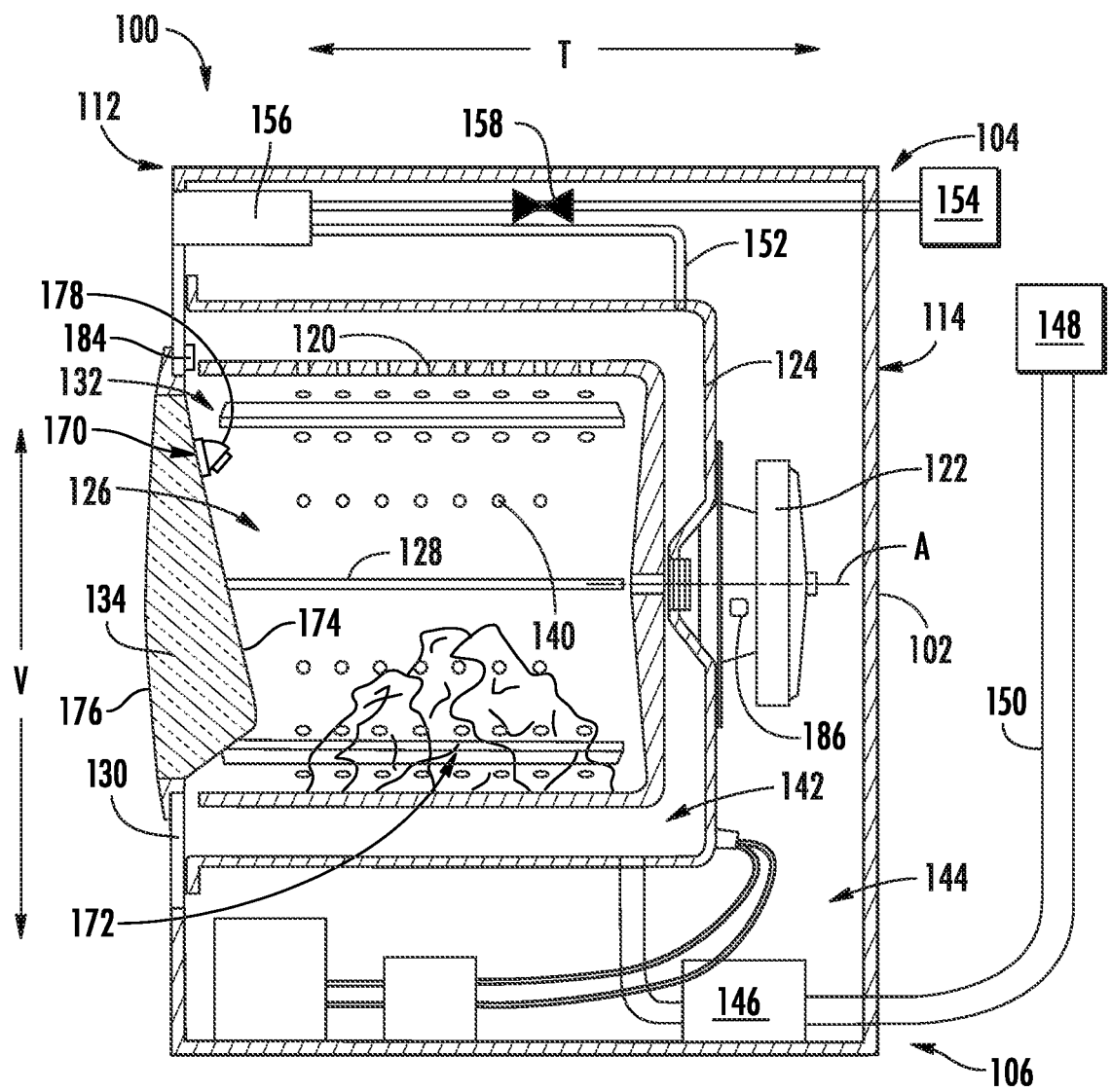
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve assembly 158 may provide a flow of water from a water supply source (such as a municipal water supply 154) into detergent dispenser 156 and into wash tub 124. In this manner, water supply valve assembly 158 may generally be operable to supply water into detergent dispenser 156 to generate a wash fluid, e.g., for use in a wash cycle, or a flow of fresh water, e.g., for a rinse cycle. It should be appreciated that water supply valve assembly 158 may be positioned at any other suitable location within cabinet 102. Moreover, it should be appreciated that water supply valve assembly 158 may include a plurality of water supply valves for independently regulating different flows of water. In this regard, for example, water supply valve assembly 158 may include two ports for receiving a hot water supply line and a cold water supply line. Water supply valve assembly 158 may further include a hot water supply valve for selectively regulating the flow of water to the hot water supply line and a cold water supply valves for selectively regulating the flow of water through the cold water supply line. In addition, although water supply valve assembly 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users. Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Figure 3:
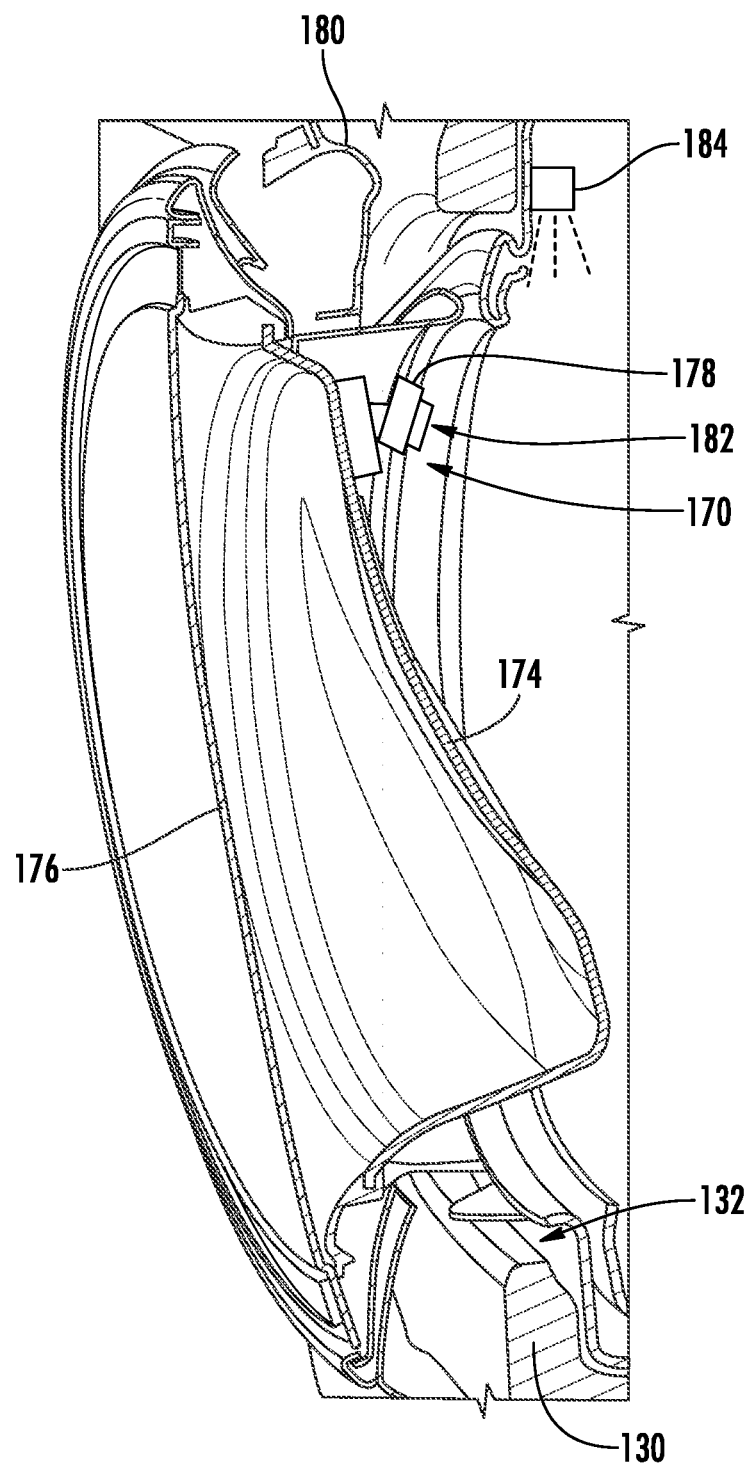
FIG. 3 provides a cross-sectional view of the exemplary washing machine appliance of FIG. 1 with a camera assembly mounted on a door according to an exemplary embodiment of the present subject matter.

Referring now specifically to FIGS. 2 and 3, washing machine appliance 100 may further include a camera assembly 170 that is generally positioned and configured for obtaining images of wash chamber 126 or a load of clothes (e.g., as identified schematically by reference numeral 172) within wash chamber 126 of washing machine appliance 100. Specifically, according to the illustrated embodiment, door 134 of washing machine appliance 100 comprises and inner window 174 that partially defines wash chamber 126 and an outer window 176 that is exposed to the ambient environment. According to the illustrated exemplary embodiment, camera assembly 170 includes a camera 178 that is mounted to inner window 174. Specifically, camera 178 is mounted such that is faces toward a bottom side of wash tub 124. In this manner, camera 178 can take images or video of an inside of wash chamber 126 and remains unobstructed by windows that may obscure or distort such images.

Figure 4:
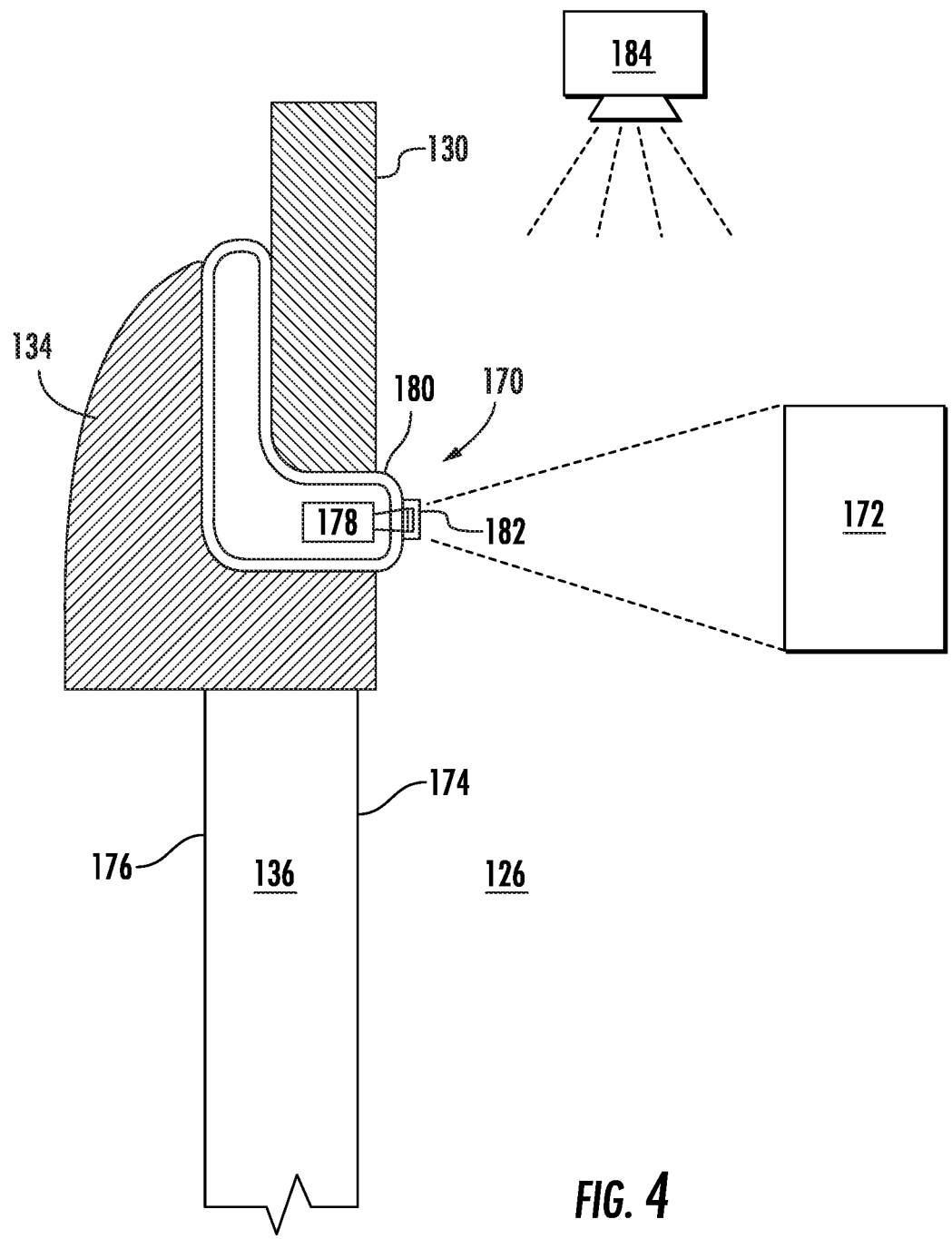
FIG. 4 provides a schematic view of a door and gasket sealed against a cabinet of the exemplary washing machine of FIG. 1, along with a camera mounted within the gasket according to an exemplary embodiment of the present subject matter.

Referring now briefly to FIG. 4, another installation of camera assembly 170 will be described according to an exemplary embodiment of the present subject matter. Due to the similarity between this and other embodiments, like reference numerals may be used to refer to the same or similar features. According to this exemplary embodiment, camera assembly 170 is mounted within a gasket 180 that is positioned between a front panel 130 of cabinet 102 and door 134. Although exemplary camera assemblies 170 are illustrated and described herein, it should be appreciated that according to alternative embodiments, washing machine appliance 100 may include any other camera or system of imaging devices for obtaining images of the load of clothes 172 or wash chamber 126.

It should be appreciated that camera assembly 170 may include any suitable number, type, size, and configuration of camera(s) 178 for obtaining images of wash chamber 126. In general, cameras 178 may include a lens 182 that is constructed from a clear hydrophobic material or which may otherwise be positioned behind a hydrophobic clear lens. So positioned, camera assembly 170 may obtain one or more images or videos of clothes 172 within wash chamber 126, as described in more detail below. Referring still to FIGS. 2 through 4, washing machine appliance 100 may further include a tub light 184 that is positioned within cabinet 102 or wash chamber 126 for selectively illuminating wash chamber 126 and/or the load of clothes 172 positioned therein.

According to exemplary embodiments of the present subject matter, washing machine appliance 100 may further include a basket speed sensor 186 (FIG. 2) that is generally configured for determining a basket speed of wash basket 120. In this regard, for example, basket speed sensor 186 may be an optical, tactile, or electromagnetic speed sensor that measures a motor shaft speed (e.g., such as a tachometer, hall-effect sensor, etc.). According to still other embodiments, basket speeds may be determined by measuring a motor frequency, a back electromotive force (EMF) on motor 122, or a motor shaft speed in any other suitable manner. Accordingly, it should be appreciated that according to exemplary embodiments, a physical basket speed sensor 186 is not needed, as electromotive force and motor frequency may be determined by controller 166 without needing a physical speed sensor. It should be appreciated that other systems and methods for monitoring basket speeds may be used while remaining within the scope of the present subject matter.

Notably, controller 166 of washing machine appliance 100 (or any other suitable dedicated controller) may be communicatively coupled to camera assembly 170, tub light 184, basket speed sensor 186, and other components of washing machine appliance 100. As explained in more detail below, controller 166 may be programmed or configured for obtaining images using camera assembly 170, e.g., in order to detect certain operating conditions and improve the performance of washing machine appliance. In addition, controller 166 may be programmed or configured to perform methods to identify leftover articles of laundry after an operating cycle.

Referring still to FIG. 1, a schematic diagram of an external communication system 190 will be described according to an exemplary embodiment of the present subject matter. In general, external communication system 190 is configured for permitting interaction, data transfer, and other communications with washing machine appliance 100. For example, this communication may be used to provide and receive operating parameters, cycle settings, performance characteristics, user preferences, user notifications, or any other suitable information for improved performance of washing machine appliance 100.

External communication system 190 permits controller 166 of washing machine appliance 100 to communicate with external devices either directly or through a network 192. For example, a consumer may use a consumer device 194 to communicate directly with washing machine appliance 100. For example, consumer devices 194 may be in direct or indirect communication with washing machine appliance 100, e.g., directly through a local area network (LAN), Wi-Fi, Bluetooth, Zigbee, etc. or indirectly through network 192. In general, consumer device 194 may be any suitable device for providing and/or receiving communications or commands from a user. In this regard, consumer device 194 may include, for example, a personal phone, a tablet, a laptop computer, or another mobile device.

In addition, a remote server 196 may be in communication with washing machine appliance 100 and/or consumer device 194 through network 192. In this regard, for example, remote server 196 may be a cloud-based server 196, and is thus located at a distant location, such as in a separate state, country, etc. In general, communication between the remote server 196 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL).

In general, network 192 can be any type of communication network. For example, network 192 can include one or more of a wireless network, a wired network, a personal area network, a local area network, a wide area network, the internet, a cellular network, etc. According to an exemplary embodiment, consumer device 194 may communicate with a remote server 196 over network 192, such as the internet, to provide user inputs, transfer operating parameters or performance characteristics, receive user notifications or instructions, etc. In addition, consumer device 194 and remote server 196 may communicate with washing machine appliance 100 to communicate similar information.

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more laundry appliances, other communication protocols and steps may be implemented, etc. These variations and modifications are contemplated as within the scope of the present subject matter.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in a combination washer/dryer appliance. Indeed, it should be appreciated that aspects of the present subject matter may further apply to other laundry appliances, such a dryer appliance. In this regard, the same methods and systems as described herein may be used to detect or identify leftover laundry articles in other appliances, such as a dryer appliance.

Now that the construction of washing machine appliance 100 and the configuration of controller 166 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 166 or a separate, dedicated controller.

Figure 5:
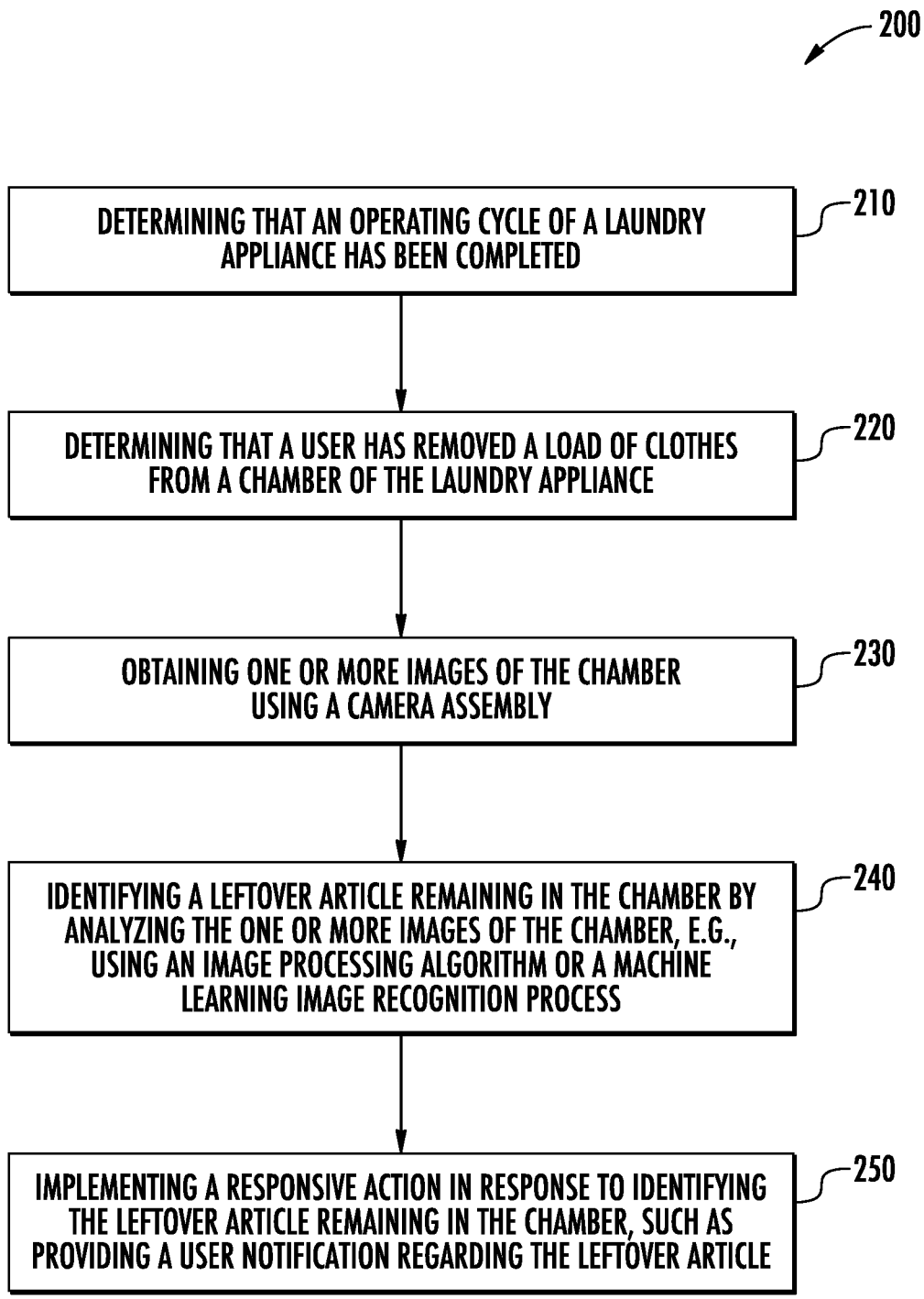
FIG. 5 illustrates a method for operating a washing machine appliance in accordance with one embodiment of the present disclosure.

Referring now to FIG. 5, method 200 includes, at step 210, determining that an operating cycle of a laundry appliance has been completed. In this regard, continuing the example from above, controller 166 may determine that an operating cycle of washing machine appliance 100 has been completed and that items of clothing 172 are ready for removal and/or transfer to an associated dryer appliance. As used herein, the terms "associated dryer appliance" and the like are generally intended to refer to a dryer appliance paired with a particular washing machine appliance, such as a dryer appliance positioned adjacent to and in the same room as a washing machine appliance 100. In addition, the associated dryer appliance may refer to the connected dryer appliance in the case of a combination washer/dryer unit or any other dryer appliance intended to receive the load of clothes washed in washing machine appliance 100.

Notably, the step of determining that an operating cycle of the laundry appliance has been completed may include any suitable triggering events or conditions that may be detected by the appliance controller or an appliance controller of an associated appliance (e.g., such as associated dryer appliance). For example, determining that the operating cycle has been completed may include determining that the last function or sub cycle of the washing machine appliance has been performed for a particular load of clothes. In addition, or alternatively, the appliance controller may determine that the appliance operating cycle is complete when the door is unlocked after the operating cycle, thus permitting a user to remove clothes 172 from within chamber 126.

After the operating cycle is completed, a user typically removes the load of clothes 172 positioned within chamber 126. For example, if the laundry appliance is a washing machine appliance, the user may remove the load of clothes 172 in order to place them into a dryer appliance to facilitate a drying operation. By contrast, if the laundry appliance is a dryer appliance, the user may remove the load of clothes 172 in order to fold, hang, or otherwise store load of clothes 172 for future use. In either event, as explained briefly above, a user may inadvertently leave one or more items, referred to herein as "leftover articles," in the chamber of the appliance. As a result, a user may believe that the leftover article has been lost, may fail to perform subsequent laundry tasks on the leftover article of clothing (such as drying or folding), or may otherwise be dissatisfied with the performance of the appliance. As such, aspects of the present subject matter are generally directed to methods of identifying leftover articles or otherwise determining that less than all of the load of clothes 172 has been removed from the chamber of a laundry appliance.

Thus, step 220 may further include determining that a user has removed a load of clothes from a chamber of the laundry appliance. In this regard, determining that the user has removed the load of clothes may include various triggering conditions. For example, if the controller of the appliance determines that the door has been opened after completion of the operating cycle and the door is subsequently closed, the controller may presume that the user opened the door to remove the load of clothes. By contrast, if the door of the appliance has been opened after an operating cycle and no action has been taken within a predetermined amount of time, the controller may presume that the user has removed the load of clothes. It should be appreciated that the predetermined amount time may be any suitable time such as one minute, two minutes, three minutes, five minutes, or any other suitable time period.

According to still other embodiments, the triggering event may be based on subsequent actions performed by the laundry appliance or an associate a laundry appliance. In this regard, if the laundry appliance is a washing machine appliance, the triggering event that results in a determination that the user has removed the clothes may be depressing of one or more buttons on the washing machine appliance to begin initiation of another washing machine cycle. By contrast, washing machine appliance may be in communication with an associated dryer appliance, such that initiating a drying cycle or otherwise manipulating the dryer appliance (e.g., by determining that a user has initiated cycle selection for an associated dryer appliance, made dryer operating parameter inputs, etc.) in preparation for a drying cycle may trigger the washing machine appliance into determining that the user has removed the load of clothes. In any event, once the laundry appliance determines that the user has removed the load of clothes, method 200 may include steps for identifying any articles that may have been inadvertently leftover.

Specifically, step 230 includes obtaining one or more images of the chamber using a camera assembly. According to exemplary embodiments, step 230 of obtaining images of the chamber may be performed any time after the operating cycle has been completed. For example, camera assembly 170 of washing machine appliance 100 may constantly monitor the wash chamber 126 after the operating cycle, after the door 134 is opened, etc. By periodically or constantly obtaining images of wash chamber, controller 166 may obtain useful knowledge or data for determining when the load of clothes of been removed and/or if any articles have been left behind. Although method 200 is described herein with respect to the use of camera assembly 170 within washing machine appliance 100, it should be appreciated that aspects of the present subject matter may be used in any other suitable laundry appliance, such a dryer appliance, combination washer/dryer appliance, etc.

In general, step 230 includes obtaining one or more images, a series of images/frames, or a video of wash chamber 126. Step 230 may further include taking a still image from the video clip or otherwise obtaining a still representation or photo from the video clip. It should be appreciated that the images obtained by camera assembly 170 may vary in number, frequency, angle, resolution, detail, etc. In addition, according to exemplary embodiments, controller 166 may be configured for illuminating the tub using tub light 184 just prior to obtaining images. In this manner, by ensuring wash chamber 126 is well illuminated, camera assembly 170 should be capable of obtaining a clear image of wash chamber 126. Notably, as explained herein, the images obtained at step 230 are used to identify leftover articles of clothing within wash chamber 126 according to exemplary embodiments of the present subject matter.

Referring again to FIG. 5, method 200 may include, at step 240, identifying a leftover article remaining in the chamber by analyzing the one or more images of the chamber. For example, controller 166 may utilize any suitable image recognition software or algorithm to constantly or periodically monitor the wash chamber to determine whether the load of clothes has been removed and whether any articles of clothing remain. According to exemplary embodiments, step 240 may include utilizing an image processing algorithm, a machine learning image recognition process, and/or any other suitable image analysis techniques, examples of which will be described in more detail below.

Each of these image evaluation processes will be described below according to exemplary embodiments of the present subject matter. It should be appreciated that image processing and machine learning image recognition processes may be used together to extract detailed information regarding the presence of clothes within wash chamber 126 to facilitate improved appliance operation and prevent a user from leaving articles behind after an operating cycle. According to exemplary embodiments, any suitable number and combination of image processing or analysis techniques may be used to obtain an accurate representation of the wash chamber and/or any articles of clothing leftover after the operating cycle.

As used herein, the term "image processing algorithm" and the like is generally intended to refer to any suitable methods or algorithms for analyzing images of wash chamber 126 that do not rely on artificial intelligence or machine learning techniques (e.g., in contrast to the machine learning image recognition process is described below). For example, the image processing algorithm may rely on image differentiation, e.g., such as a pixel-by-pixel comparison of two sequential images. For example, the images obtained at step 230 may be compared to a series of images of a wash chamber with and/or without any clothes positioned therein. By comparing differences between the actual obtained images of the wash chamber to images having various levels of clothing, controller 166 may determine which image is most similar and may identify the presence of leftover articles accordingly.

As noted above, step 240 may further identify leftover articles using a machine learning image recognition process. In this regard, the images obtained at step 230 may be used by controller 166 for identifying leftover articles within wash chamber 126. In addition, it should be appreciated that this image analysis or processing may be performed locally (e.g., by controller 166) or remotely (e.g., by a remote server 196). According to exemplary embodiments of the present subject matter, step 240 may include analyzing the images of the wash chamber using a neural network classification module and/or a machine learning image recognition process. In this regard, for example, controller 166 may be programmed to implement the machine learning image recognition process that includes a neural network trained with a plurality of images of wash chambers having different loading states, such as full or empty wash chambers. By analyzing the images obtained at step 210 using this machine learning image recognition process, controller 166 may identify the presence of leftover articles within wash basket 120, along with other useful qualitative or quantitative information.

As used herein, the terms image recognition process and similar terms may be used generally to refer to any suitable method of observation, analysis, image decomposition, feature extraction, image classification, etc. of one or more images or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 170 and controller 166 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object. In this regard, a "region proposal" may be regions in an image that could belong to a particular object, such as a garment or load of clothes within the wash basket. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 240 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image and identify the presence of leftover articles within wash basket 120. In addition, a K-means algorithm may be used. Other image recognition processes are possible and within the scope of the present subject matter.

It should be appreciated that any other suitable image recognition process may be used while remaining within the scope of the present subject matter. For example, step 240 may include using a deep belief network ("DBN") image recognition process. A DBN image recognition process may generally include stacking many individual unsupervised networks that use each network's hidden layer as the input for the next layer. According to still other embodiments, step 240 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Step 250 may include implementing a responsive action in response to identifying the leftover article remaining in the chamber. For example, according to an exemplary embodiment, implementing the responsive action may include adjusting at least one operating parameter of the washing machine appliance 100 or an associated dryer appliance. For example, method 200 may include preventing further operating cycles of either washing machine appliance 100 or the associated dryer appliance until the user has been notified and the leftover article has been removed. In this manner, a user must become aware of the issue and remove the leftover article before further operations are performed.

In addition, step 250 of implementing a responsive action may further include providing a user notification that the leftover article remains in the chamber. In addition, this user notification may include useful information such as the precise location of the article of clothing, an image of the chamber including an identifying mark or arrow pointing to the leftover article, or any other useful information regarding the leftover article. It should be appreciated that the user notification may be provided to the user from any suitable source and in any suitable manner. For example, according to exemplary embodiments, the user notification may be provided through control panel 160 so that the user may be aware of the leftover article (e.g., such as via an illuminated warning indicator, an image displayed on a screen, etc.). In addition, or alternatively, controller 166 may be configured to provide a user notification to a remote device, such as remote device 194 via a network 192. Whether provided via control panel 160, remote device 194, or by other means, this user notification may include useful information regarding the presence, location, or other information related to the leftover article. For example, the user notification may include a pop-up notification on a user's cell phone or other remote device and may include a display of the one or more images with a circle around the leftover article.

Figure 6:
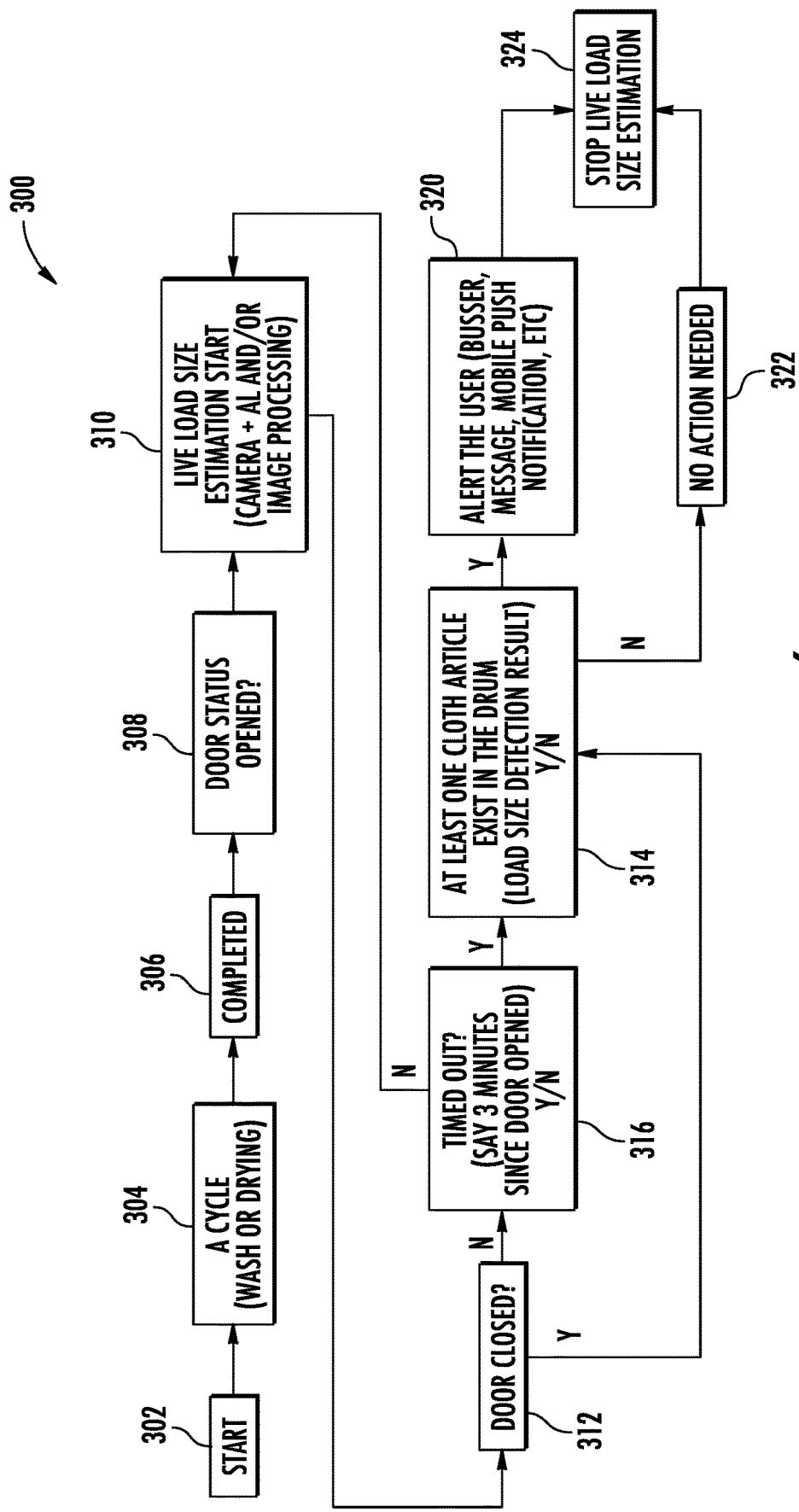
FIG. 6 illustrates a flow diagram illustrating an exemplary process for identifying leftover articles in a chamber of a laundry appliance according to an exemplary embodiment of the present subject matter.

Referring now briefly to FIG. 6, an exemplary flow diagram of a leftover article detection method 300 that may be implemented by washing machine appliance 100 (or another laundry appliance) will be described according to an exemplary embodiment of the present subject matter. According to exemplary embodiments, method 300 may be similar to or interchangeable with all or a portion of method 200 and may be implemented by controller 166 of washing machine appliance 100. As shown, at step 302, method 300 may include starting an operating cycle of a washing machine appliance, such as washing machine appliance 100. The cycle may be performed at step 304 and completed at step 306. After the operating cycle is completed the appliance controller may determine that the door has been opened at step 308. Step 310 includes a live load size estimation or leftover article identification method where a series of images of the wash chamber are obtained and analyzed (e.g., as described above) to determine the volume of clothes, the presence of clothes or a leftover article, etc.

According to the exemplary embodiment, step 312 may include determining whether the door of the appliance has been closed. If the door has been closed, it can be assumed that the user removed the load of clothes positioned therein. Thus, step 314 may include determining that there is at least one leftover article of clothing within the wash chamber after the load of clothes been removed. In addition, if step 312 results in a determination that the door has not been closed, step 310 of estimating load size or detecting left of articles may be repeated until a timeout occurs at step 316. In this regard, failure to remove a load of clothes within a predetermined amount of time after opening the door may result in a determination or assumption that the load of clothes has been removed. As a result, if the door has been open for the predetermined amount of time (e.g., such as three minutes), method 300 may proceed to step 314 where leftover articles are identified. If step 314 results in the identification of a leftover article, step 320 may include alerting the user as to the presence of the leftover article, such as by a notification on the control panel, a push notification to the user's cell phone, a display of the obtained images and associated leftover articles on a control panel display, etc. By contrast, if no leftover article is detected at step 314, method 300 may proceed to step 322 where no action is needed. Method 300 may end at step 324 until a new load of clothes is added and a new operating cycle is commenced.

FIGS. 5 and 6 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using washing machine appliance 100 as an example, it should be appreciated that this method may be applied to the operation of any suitable laundry appliance, such as another washing machine appliance or a dryer appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance comprising:
a cabinet;
a basket rotatably mounted within the cabinet and defining a chamber configured for receiving a load of clothes;
a door rotatably mounted to the cabinet for providing selective access to the chamber;
a camera assembly mounted within the cabinet and in view of the chamber; and
a controller operably coupled to the camera assembly, the controller being configured to:
determine that an operating cycle of the laundry appliance has been completed by identifying at least one of the following: determining that a last function or sub cycle of a washing machine appliance has been performed for a particular load of clothes; or determining that a door is unlocked after the operating cycle;
determine that a user has removed the load of clothes by identifying at least one of the following: determining that the door has been opened and determining that the door has been closed; determining that the door has been opened and determining that no other action has been taken within a predetermined time; wherein the laundry appliance is a washing machine appliance, and determining that a user has initiated a cycle selection for an associated dryer appliance; or determining that one or more buttons on the laundry appliance have been depressed to begin initiation of another operating cycle;
obtain one or more images of the chamber using the camera assembly;
identify a leftover article remaining in the chamber by analyzing the one or more images of the chamber; and
implement a responsive action in response to identifying the leftover article remaining in the chamber.

2. The laundry appliance of claim 1, wherein the predetermined time is three minutes.

3. The laundry appliance of claim 1, wherein analyzing the one or more images of the chamber comprises:
implementing an image processing algorithm on the one or more images.

4. The laundry appliance of claim 3, wherein the image processing algorithm utilizes image differentiation.

5. The laundry appliance of claim 1, wherein analyzing the one or more images of the chamber comprises:
analyzing the one or more images using a machine learning image recognition process, the machine learning image recognition process being programmed into the controller.

6. The laundry appliance of claim 5, wherein the machine learning image recognition process comprises at least one of a convolution neural network ("CNN"), a region-based convolution neural network ("R-CNN"), a deep belief network ("DBN"), or a deep neural network ("DNN") image recognition process.

7. The laundry appliance of claim 1, wherein implementing the responsive action comprises:
providing a user notification that the leftover article remains in the chamber.

8. The laundry appliance of claim 7, further comprising:

a user interface panel, wherein the user notification is provided through the user interface panel.

9. The laundry appliance of claim 7, wherein the controller is in operative communication with a remote device through an external network, and wherein the user notification is provided through the remote device.

10. The laundry appliance of claim 9, wherein the user notification includes displaying the one or more images on the remote device.

11. The laundry appliance of claim 1, further comprising:
a gasket positioned between wherein the door and the cabinet, wherein the camera assembly is mounted in the gasket or on an inner surface of the door.

12. The laundry appliance of claim 1, wherein the laundry appliance is a washing machine appliance, a dryer appliance, or a combination washer/dryer appliance.

13. A method of operating a laundry appliance, the laundry appliance comprising a basket rotatably mounted within a cabinet and defining a chamber configured for receiving a load of clothes, a door rotatably mounted to the cabinet for providing selective access to the chamber, and a camera assembly mounted within the cabinet in view of the chamber, the method comprising:
determining that an operating cycle of the laundry appliance has been completed by identifying at least one of the following: determining that a last function or sub cycle of a washing machine appliance has been performed for a particular load of clothes; or determining that a door is unlocked after the operating cycle;
determining that a user has removed the load of clothes by identifying at least one of the following: determining that the door has been opened and determining that the door has been closed; determining that the door has been opened and determining that no other action has been taken within a predetermined time; wherein the laundry appliance is a washing machine appliance, and determining that a user has initiated a cycle selection for an associated dryer appliance; or determining that one or more buttons on the laundry appliance have been depressed to begin initiation of another operating cycle;
obtaining one or more images of the chamber using the camera assembly;
identifying a leftover article remaining in the chamber by analyzing the one or more images of the chamber; and
implementing a responsive action in response to identifying the leftover article remaining in the chamber.

14. The method of claim 13, wherein analyzing the one or more images of the chamber comprises:
implementing an image processing algorithm on the one or more images.

15. The method of claim 13, wherein analyzing the one or more images of the chamber comprises:
analyzing the one or more images using a machine learning image recognition process.

* * * * *